C. O. ANDERSON.
AUTOMATIC SLACK ADJUSTER.
APPLICATION FILED MAR. 30, 1908.
923,927.
Patented June 8, 1909.
3 SHEETS—SHEET 2.
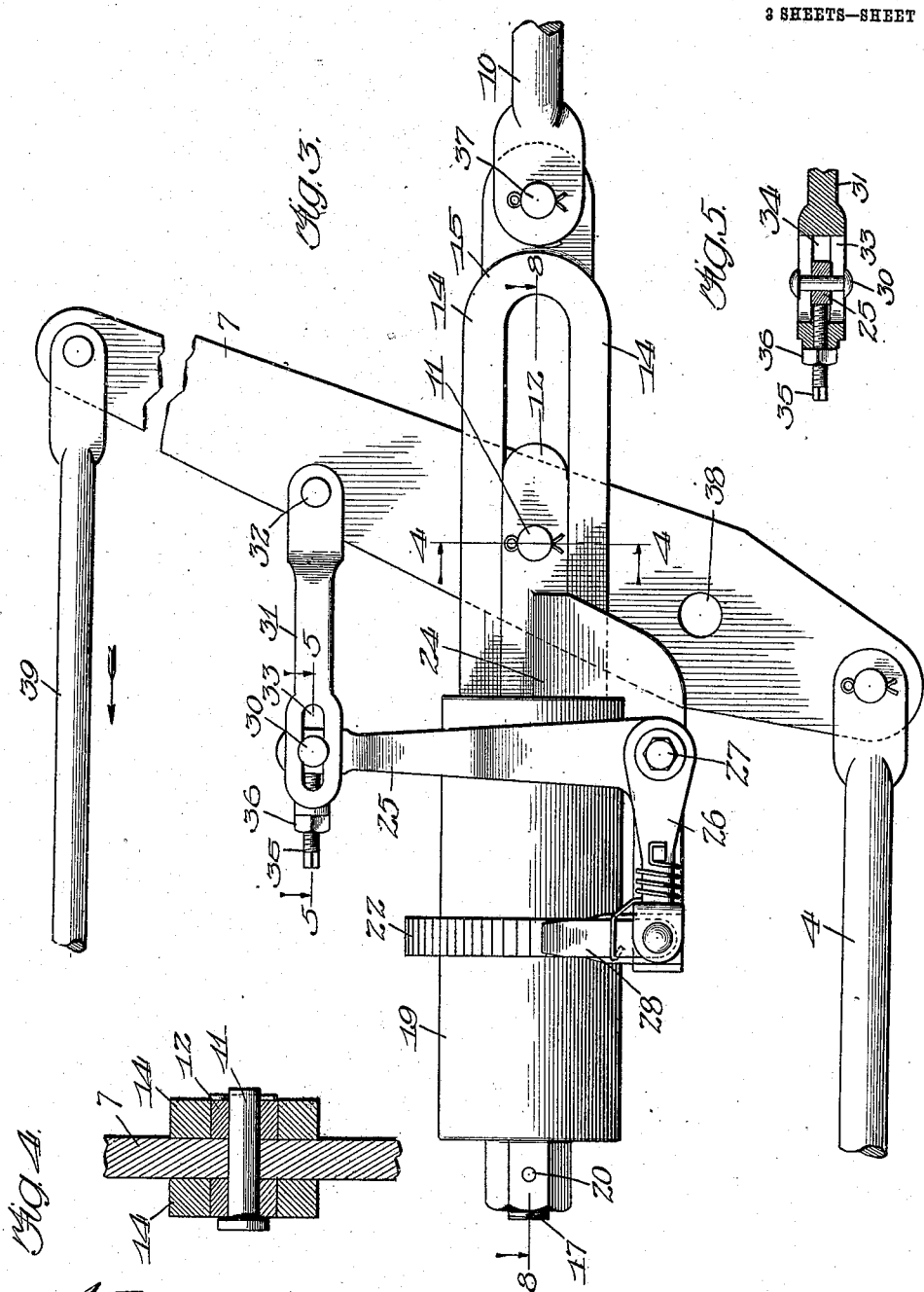

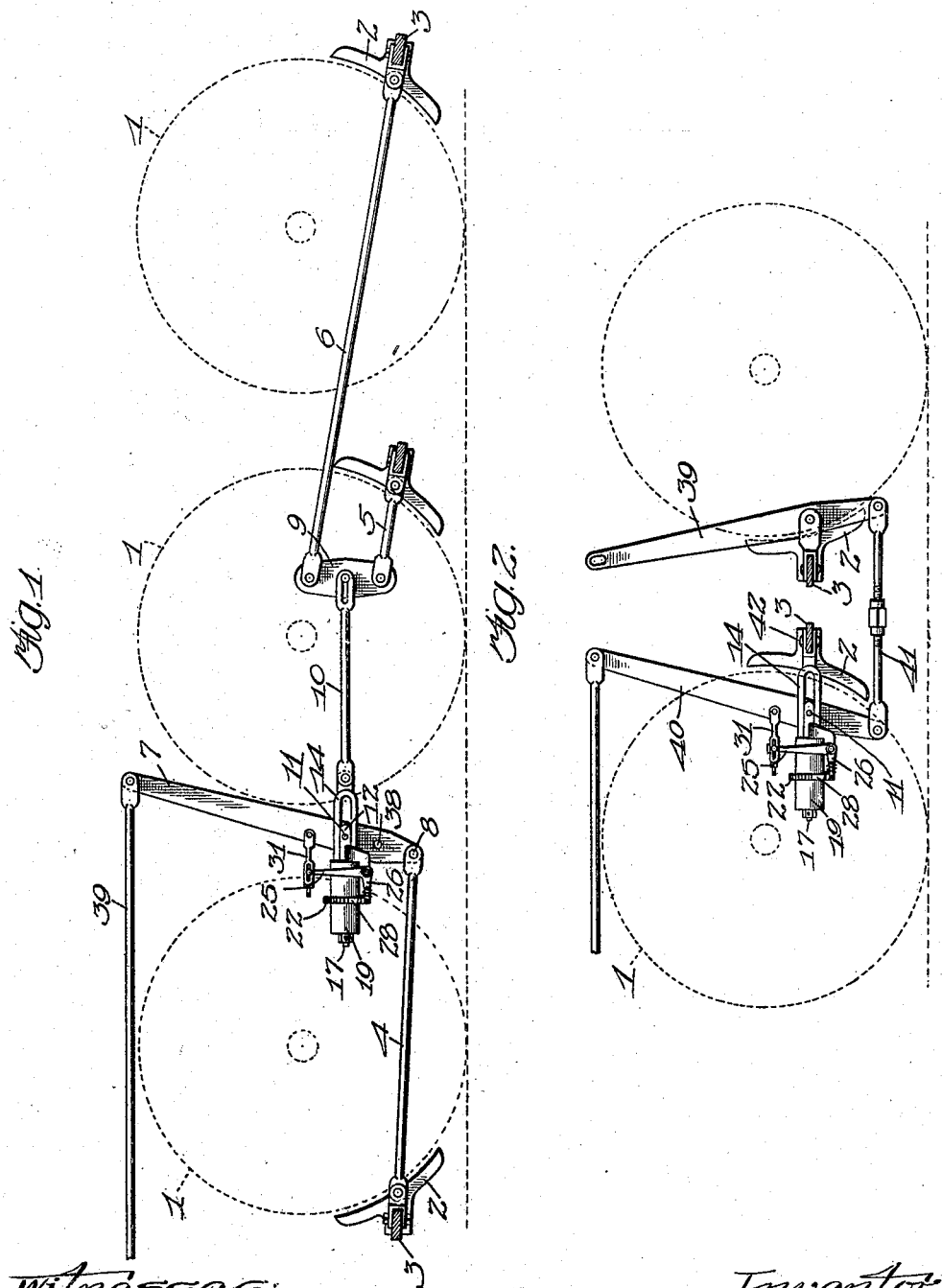

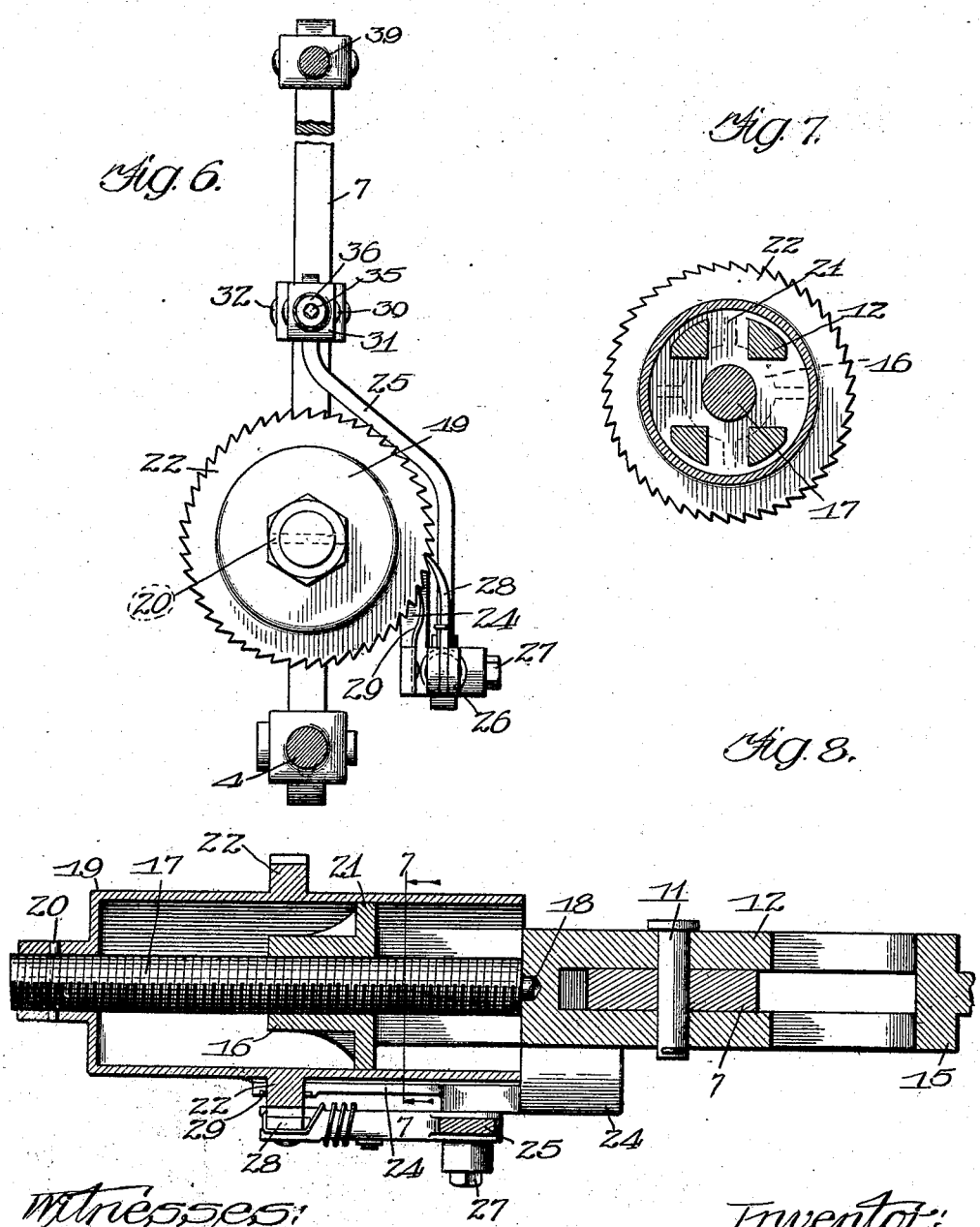

UNITED STATES PATENT OFFICE.

CHARLES O. ANDERSON, OF OMAHA, NEBRASKA, ASSIGNOR OF ONE-HALF TO A. T. AUSTIN, OF OMAHA, NEBRASKA.

AUTOMATIC SLACK-ADJUSTER.

No. 923,927.      Specification of Letters Patent.      Patented June 8, 1909.

Application filed March 30, 1908. Serial No. 424,050.

*To all whom it may concern:*

Be it known that I, CHARLES O. ANDERSON, a citizen of the United States, residing at Omaha, county of Douglas, and State of Nebraska, have invented certain new and useful Improvements in Automatic Slack-Adjusters, of which the following is a description.

My invention relates to means for taking up the slack, or adjusting the coöperating members of a brake mechanism to compensate for wear or the distortion of the parts incident to practical operation.

The object of my invention is to provide a simple, efficient, and durable device of the kind described and one requiring very little or no attention except when it is necessary to renew the shoes.

To this end my invention consists in the novel construction, arrangement, and combination of parts herein shown and described, and more particularly pointed out in the claims.

In the accompanying drawings, wherein like or similar reference characters indicate like or corresponding parts; Figure 1 is a side elevation of my device adapted for use upon a six wheel truck with the parts shown in operative position. Fig. 2 is a side elevation of my mechanism in the form adapted to be applied to a four wheel truck where the brake shoes are hung between the wheels. Fig. 3 is an enlarged detail of the adjusting mechanism of my device. Fig. 4 is a section taken substantially on line 4—4 of Fig. 3. Fig. 5 is a section taken substantially on line 5—5 of Fig. 3. Fig. 6 is an enlarged elevation of that portion of my device shown in Fig. 3. Fig. 7 is a section taken substantially on line 7—7 of Fig. 8; and Fig. 8 is a section taken substantially on line 8—8 of Fig. 3.

In the form shown in the drawings, my device is arranged for use upon the ordinary forms of trucks employed upon passenger coaches and the like. Fig. 1 is adapted to that form having three wheels upon each side and a brake shoe adapted to engage the face of each wheel. In this form 1—1 are wheels to which the brake shoes 2—2 are applied. Each of the said brake shoes are mounted in the usual or any preferred manner to a brake beam 3. The several brake beams are in turn connected by means of rods 4, 5 and 6 respectively to suitable portions of the brake operating mechanism. In the form shown one end of the rod 4 is connected directly to the lower end of the live lever 7 as at 8 while the rods 5 and 6 extend from their respective brake beams 3 and are attached to the opposite ends of an equalizing bar 9. The equalizing bar 9 is connected by a rod 10 and my adjusting mechanism to the live lever 7 at 11. The adjusting mechanism is arranged to gradually draw the equalizing bar 9 toward the lever 7 as the shoes 2 are worn away in service and thus maintain the proper operative positions of the several parts throughout the life of the shoes.

The whole arrangement of the brake shoes, connecting rods and levers being preferably substantially the same as that usually employed upon this class of trucks with the single exception that my adjusting mechanism is provided in the connection between the equalizing bar 9 and lever 7 for automatically maintaining the several parts in position so that the movement of the lever 7 may be substantially the same at all times during the life of the brake shoes. My adjusting mechanism is mounted directly upon the live lever 7 and is only connected to the other portions of the brake mechanism by the rod 10. The several parts of my device are so arranged that upon excessive movement of the lever 7 the mechanism will be operated to draw the rod 9 toward the lever 7 and thus compensate for the wear or distortion of the parts.

In the form shown a clevis 12 is provided adapted to receive the lever 7 between its arms and pivotally support the same in position by a pin or equivalent means engaging the lever as at 11. A suitable guide is provided to engage the arms of the clevis 12 and support the same in position. As shown this guide comprises four substantially parallel bars 14—14 suitably spaced from each other to receive the arms of the clevis between them horizontally and the lever 7 between them vertically. The bars 14 are preferably connected at each end as at 15 and 16 and their length is sufficient to permit of the desired adjustment of the clevis to take up the preferred amount of slack in the brake mechanism.

Any suitable means may be provided for adjusting the position of the clevis upon the bars 14 forming the guide. In the form shown a threaded rod 17 is mounted in a suitable threaded opening in the end 16 of the guide so that the adjusting member 17 extends substantially parallel to the bars 14 in a position to engage the clevis 12. A small cylindrical projection or gudgeon 18 is preferably provided upon the inner end of the adjusting member 17 adapted to coöperate with a suitable recess upon the clevis to maintain the proper position of the member 17 and prevent its cramping or binding when in service and insure its satisfactory operation.

Any desired means may be provided for controlling the operation of the adjusting member 17. In the form shown a sleeve 19 is rigidly attached to the outer end of the member 17 in any suitable manner as for example by threading a suitable portion of the sleeve to fit the member 17 and securing the same against rotation by a pin 20 or other suitable means. The sleeve 19 is preferably of substantially the same length as the adjusting member 17 so that when the clevis 12 is at the limit of its travel toward the end 16 of the guide the end of the sleeve 19 will extend substantially to the end of the adjusting member 17 or to the inner face of the end 16 of the guide, where a flange or equivalent means 21 is preferably provided of suitable size to fit the internal bore of the sleeve 19 and thus exclude dust or other foreign matter from the adjusting member and also support the free end of the sleeve. A ratchet wheel 22 or other suitable means is mounted upon, or formed integral with, the sleeve 19 to afford convenient means for operating the adjusting member 17 by rotating the same when desired.

Any suitable means may be provided for engaging the ratchet wheel 22 and rotating the same when it is necessary to take up or adjust the brake rigging. For this purpose a bracket 24 is shown upon one arm of the clevis 12 with the free end of the bracket extending slightly beyond the ratchet wheel 22 when the several parts are in operative position. A bell crank lever 25—26 is pivotally mounted upon the bracket 24 as at 27 with its arm 26 provided with a spring actuated pawl 28 arranged to engage the teeth of the ratchet wheel. A spring pawl 29 is mounted upon the free end of the bracket 24 adapted to engage the teeth of the ratchet wheel 22 to insure the continuous rotation of the ratchet wheel in one direction by the operation of the spring pawl 28. Obviously when so constructed the sleeve 19 and clevis 12 will always maintain the same relation to each other, so that there will never be any tendency of the pawls 28 and 29 to move longitudinally of the sleeve and thus get out of engagement with the wheel 22 although it is obvious that if desired suitable means may be provided for attaching the clevis 12 and member 17 to prevent the possibility of such movement. Any suitable means may be provided to operate the bell crank lever 25—26 to adjust the position of the parts when the brake mechanism becomes worn or distorted and require adjustment.

In the form shown a pin 30 is provided in the free end of the arm 25 and a connecting rod 31 is pivotally connected to the lever 7 as at 32 and provided with a slotted opening 33 for the pin 30. A similar slot 34 is provided for the extremity of the arm 25 so that when the movement of the lever 7 is not excessive the pin 30 and the extremity of the arm 25 will merely move longitudinally of the slots when the lever 7 is operated. When, however, the movements of the parts become excessive, the movement of the lever 7 to set the brakes that is, in the direction indicated on the brake operating rod 39 (see Fig. 3) will cause the end of the slot next the lever 7 to engage the pin 30 and move the pawl 28 into position to engage the next tooth upon the ratchet 22. When the brakes are released the movement of the lever will cause the opposite end of the slot 33 to engage the pin 30 or the extremity of the lever 25 and rock the lever 25—26 to partially rotate the wheel 22 and sleeve 19 and move the clevis 12 in the guide, drawing the several parts of the opposing mechanism slightly together thus tending to prevent such excessive movement.

In the form shown suitable means are provided for adjusting the permissible movement between the extremity of the lever 25 and rod 31 so that the normal movement of the lever 7 without operating the adjusting mechanism may be adjusted to suit the particular conditions in each case. For this purpose a set-screw 35 is mounted in a suitable opening in the end of the connecting rod 31. This screw extends substantially longitudinally of the slot in the rod 31 and is arranged to engage the extremity of the lever and thus limit the operative movement between the connecting rod and lever 25. A suitable jam-nut or other convenient means 36 is preferably provided to lock the same in its adjusted position. The end 15 of the guide is preferably provided with means for connecting the same to other portions of the brake mechanism. As shown this portion of the device is extended and provided with an opening, and the end of the rod 10 is formed to coöperate with the extension on the part 15 and is pivotally connected therewith by means of a pin 37 or other suitable means.

Any suitable means may be provided for supporting my brake adjusting mechanism and the adjacent portions of the brake rigging in position, for this purpose an opening 38 is preferably provided in the lever 7 and a bracket or other yielding supporting mechanism (not shown) is provided with a pin or equivalent means to engage the opening 38 to support my adjusting mechanism and the adjacent parts of the brake operating mechanism.

The operation of my brake mechanism is believed to be clearly set forth in the foregoing description of the construction of the device and no further description is believed to be necessary.

In Fig. 2, my mechanism is shown adapted to be employed in the usual form of four wheel trucks with inside hung brakes. As there shown, 39 is the "dead lever" of the brake mechanism and 40 is the "live lever" connected thereto by means of a push rod 41 in the usual manner. My adjusting mechanism is mounted as before described upon the "live lever" but with the end 15 of the guide connected directly to one of the brake beams. The operation of the device is substantially the same as heretofore described, and no further description is deemed necessary at this place.

Having thus described my improvement, it is obvious that various immaterial modifications may be made in my device without departing from the spirit of my invention, hence I do not wish to be understood as limiting myself to the exact form and construction shown.

What I claim as new, and desire to secure by Letters Patent is:—

1. A device of the kind described, comprising a clevis, and a guide adapted to coöperate with said clevis, in combination with means for adjusting the relative positions of said clevis and guide, mechanism for controlling the operation of said adjusting means, and means for attaching said clevis and said guide only to the brake rigging members.

2. A device of the kind described, comprising a clevis, and a guide adapted to coöperate with said clevis, in combination with means for adjusting the relative positions of said clevis and guide, mechanism mounted upon said clevis for controlling the operation of said adjusting means, and means for connecting said clevis and said guide to opposing members.

3. A device of the kind described, comprising a clevis, and a guide formed with a plurality of substantially parallel bars adapted to coöperate with said clevis, in combination with means for adjusting the relative positions of said clevis and guide, mechanism for controlling the operation of said adjusting means, and means for connecting said clevis and said guide to opposing members.

4. A device of the kind described, comprising a clevis, and a guide adapted to coöperate with said clevis, in combination with means mounted upon said guide and extending longitudinally thereof for adjusting the relative positions of said clevis and guide, mechanism for controlling the operation of said adjusting means, and means for attaching said clevis and said guide only to the brake rigging members.

5. A device of the kind described, comprising a clevis, and a guide adapted to coöperate with said clevis, in combination with a threaded member for adjusting the relative positions of said clevis and guide, mechanism for controlling the operation of said adjusting means, and means for attaching said clevis and said guide only to the brake rigging members.

6. A device of the kind described, comprising a clevis, and a guide adapted to coöperate with said clevis, in combination with means for adjusting the relative positions of said clevis and guide, mechanism connected to one of said brake rigging members for controlling the operation of said adjusting means, and means for connecting said clevis and said guide to opposing brake rigging members.

7. A device of the kind described, comprising a clevis, and a guide formed with a plurality of substantially parallel bars connected at their ends and arranged to engage said clevis between them, in combination with means for adjusting the relative positions of said guide and clevis, mechanism for controlling the operation of said adjusting means, and means for connecting said clevis and said guide to opposing brake rigging members.

8. A device of the kind described, comprising a clevis, and a guide adapted to coöperate with said clevis, in combination with means mounted upon said guide and extending longitudinally thereof adapted to engage said clevis and control the relative positions of said guide and clevis, mechanism for controlling the operation of said adjusting means, and means for connecting said clevis and said guide to opposing brake rigging members.

9. A device of the kind described, comprising a clevis, and a guide formed with a plurality of substantially parallel bars adapted to coöperate with said clevis, in combination with means for adjusting the relative positions of said clevis and guide, mechanism mounted upon said clevis for controlling the operation of said adjusting means, and means for connecting said clevis and said guide to opposing brake rigging members.

10. A device of the kind described, comprising a clevis, and a guide formed with a plurality of substantially parallel bars adapted to coöperate with said clevis, in combination with means mounted upon said guide extending longitudinally thereof for adjusting the relative positions of said clevis and guide, mechanism mounted upon said clevis for controlling the operation of said adjusting means, and means for connecting said clevis and said guide to opposing brake rigging members.

11. A device of the kind described, comprising a clevis, and a guide formed with a plurality of substantially parallel bars adapted to coöperate with said clevis, in combination with a threaded member mounted upon said guide extending longitudinally thereof for adjusting the relative positions of said clevis and guide, mechanism for controlling the operation of said adjusting means, and means for connecting said clevis and guide to opposing brake rigging members.

12. A device of the kind described, comprising a clevis, and a guide formed with a plurality of substantially parallel bars adapted to coöperate with said clevis, in combination with a threaded member mounted upon said guide and extending longitudinally thereof for adjusting the relative positions of said clevis and guide, mechanism mounted upon said clevis and connected to one of said brake rigging members for controlling the operation of said adjusting means, and means for connecting said clevis and said guide to opposing brake rigging members.

13. A device of the kind described, comprising a clevis, and a guide formed with a plurality of substantially parallel bars adapted to coöperate with said clevis, in combination with a threaded member mounted upon said guide extending longitudinally thereof for adjusting the relative positions of said clevis and guide, a ratchet wheel rigidly connected to said threaded member for controlling the operation thereof, means mounted upon said clevis and connected to one of said brake rigging members for rotating said ratchet wheel, and means for connecting said clevis and said guide to opposing brake rigging members.

14. A device of the kind described, comprising a clevis, and a guide formed with a plurality of substantially parallel bars adapted to coöperate with said clevis, in combination with a threaded member mounted upon said guide extending longitudinally thereof adapted to adjust the relative positions of said clevis and guide, a ratchet wheel rigidly connected to said threaded member, and a bell crank lever mounted upon said clevis and connected to one of said brake rigging members for controlling the operation of said adjusting means, and means for connecting said clevis and said guide to opposing brake rigging members.

15. A device of the kind described, comprising a clevis, and a guide formed with a plurality of substantially parallel bars connected at their ends and arranged to engage said clevis between them, in combination with a threaded member mounted upon said guide extending longitudinally thereof and arranged to engage said clevis and control its position in said guide, a ratchet wheel rigidly connected to said threaded member, mechanism mounted upon said clevis for engaging said ratchet wheel to control the operation of said adjusting means, and means for connecting said clevis and said guide to opposing brake rigging members.

16. A device of the kind described, comprising a clevis, and a guide formed with a plurality of substantially parallel bars connected at their ends and arranged to engage said clevis between them, in combination with a threaded member mounted upon said guide and extending longitudinally thereof for adjusting the relative positions of said clevis and guide, a ratchet wheel rigidly connected to said threaded member, mechanism mounted upon said clevis for engaging said ratchet wheel to control the operation of said adjusting means, and means for connecting said clevis and said guide to opposing brake rigging members.

17. A device of the kind described, comprising a clevis, and a guide adapted to coöperate with said clevis, in combination with a threaded member for adjusting the relative positions of said clevis and guide, a ratchet wheel rigidly connected to said threaded member, mechanism for engaging said ratchet wheel to control the operation of said adjusting means, and means for connecting said clevis and said guide to opposing brake rigging members.

18. A device of the kind described, comprising a clevis, and a guide adapted to coöperate with said clevis, in combination with a threaded member for adjusting the relative positions of said clevis and guide, a ratchet wheel rigidly connected to said threaded member, a bell crank lever mounted upon said clevis and provided with means for engaging said ratchet wheel to control the operation of said adjusting means, and means for connecting said clevis and guide to opposing brake rigging members.

19. A device of the kind described, comprising a clevis, and a guide adapted to coöperate with said clevis, in combination with a threaded member for adjusting the relative positions of said clevis and guide, a ratchet wheel rigidly connected to said threaded member, and mechanism mounted upon said clevis for engaging said ratchet wheel to control the operation of said adjusting means, and means for connecting said clevis and said guide to opposing brake rigging members.

20. A device of the kind described, comprising a clevis, and a guide adapted to coöperate with said clevis, in combination with a threaded member for adjusting the relative positions of said clevis and guide, a ratchet wheel rigidly connected to said threaded member, mechanism connected to one of said brake rigging members for engaging said ratchet wheel to control the operation of said adjusting means, and means for connecting said clevis and said guide to opposing brake rigging members.

21. A device of the kind described, comprising a clevis, and a guide adapted to coöperate with said clevis, in combination with a threaded member for adjusting the relative positions of said clevis and guide, a ratchet wheel rigidly connected to said threaded member, a bell crank lever mounted upon said clevis and provided with means for engaging said ratchet wheel to control the operation of said adjusting means, and means for connecting said clevis and guide to opposing brake rigging members.

22. A device of the kind described, comprising a clevis, and a guide adapted to coöperate with said clevis, in combination with a threaded member for adjusting the relative positions of said clevis and guide, a ratchet wheel rigidly connected to said threaded member, a bell crank lever mounted upon said clevis and connected to one of said brake rigging members and provided with means for engaging said ratchet wheel to control the operation of said adjusting means, and means for connecting said clevis and said guide to opposing brake rigging members.

23. A device of the kind described, comprising a clevis, and a guide formed with a plurality of substantially parallel bars connected at each end and arranged to engage said clevis between them, in combination with a threaded member for adjusting the relative positions of said clevis and guide, a ratchet wheel rigidly connected to said threaded member, mechanism for engaging said ratchet wheel to control the operation of said adjusting means, and means for connecting said clevis and said guide to opposing brake rigging members.

24. A device of the kind described, comprising a clevis, and a guide formed with a plurality of substantially parallel bars connected at their ends and arranged to engage said clevis between them, in combination with a threaded member for adjusting the relative position of said clevis and guide, a ratchet wheel rigidly connected to said threaded member, a bell crank lever provided with means for engaging said ratchet wheel to control the operation of said adjusting means, and means for connecting said clevis and said guide to opposing brake rigging members.

In testimony whereof, I have hereunto signed my name in the presence of two subscribing witnesses.

CHARLES O. ANDERSON.

Witnesses:
 A. A. McClure,
 M. Engler.